United States Patent [19]

Smith et al.

[11] Patent Number: 5,575,225
[45] Date of Patent: Nov. 19, 1996

[54] AIR-POWERED APPARATUS FOR FILLING GRAIN DRILLS AND METHOD OF USING SAME

[75] Inventors: David R. Smith, Ft. Jennings, Ohio; Robert Kepple, Greene; Dennis McWilliams, Bristow, both of Iowa

[73] Assignee: Unverferth Manufacturing Company, Inc., Kalida, Ohio

[21] Appl. No.: 394,352

[22] Filed: Feb. 27, 1995

[51] Int. Cl.$^6$ .................................................. A01C 7/00
[52] U.S. Cl. .......................... 111/174; 111/925; 209/680; 406/144
[58] Field of Search .................... 111/174–176, 925; 406/1, 39, 41, 122, 144, 154, 155; 209/680, 682, 906

[56] References Cited

U.S. PATENT DOCUMENTS

| | | | |
|---|---|---|---|
| 2,179,408 | 11/1939 | Gregoric | 302/17 |
| 2,614,891 | 10/1952 | Colburn | 302/49 |
| 2,746,621 | 5/1956 | McIntyre | 214/83.32 |
| 3,548,765 | 12/1970 | Grataloup | 111/174 |
| 4,212,566 | 7/1980 | Kao et al. | 406/68 |
| 4,280,419 | 7/1981 | Fischer | 111/174 |
| 4,379,664 | 4/1983 | Klein et al. | 406/68 |
| 4,473,016 | 9/1984 | Gust | 111/174 |
| 4,491,246 | 1/1985 | Dooley | 111/925 |
| 4,503,786 | 3/1985 | Tautfest | 111/174 |
| 4,538,364 | 9/1985 | Jensen | 34/233 |
| 4,541,144 | 9/1985 | Hoeck | 19/145.5 |
| 4,758,119 | 7/1988 | Frase et al. | 406/109 |
| 4,885,012 | 12/1989 | Thompson | 55/290 |
| 4,887,936 | 12/1989 | Christianson et al. | 406/171 |
| 5,035,543 | 7/1991 | Medemblik et al. | 406/39 |
| 5,156,102 | 10/1992 | Anderson | 111/176 |
| 5,189,965 | 3/1993 | Hobbs et al. | 111/174 |
| 5,379,706 | 1/1995 | Gage et al. | 111/174 |
| 5,392,722 | 2/1995 | Snipes et al. | 111/174 |

FOREIGN PATENT DOCUMENTS

| | | | |
|---|---|---|---|
| 2365285 | 4/1978 | France | 111/174 |

*Primary Examiner*—Terry Lee Melius
*Assistant Examiner*—Victor Batson
*Attorney, Agent, or Firm*—Rothwell, Figg Ernst & Kurz

[57] ABSTRACT

An apparatus for filling a grain drill with grain includes a grain hopper and a manifold assembly. The hopper includes an open upper portion and a lower portion, and a conveying conduit communicates with an outlet in the lower portion of the hopper such that grain exits the outlet into the conduit. An air blower device is positioned at an end of the conveying conduit and forces pressurized air through the conduit and beneath the hopper outlet. The air in the conveying conduit entrains grain exiting the outlet and carries the grain along the conduit to the manifold assembly mounted on the planting apparatus. The grain and air pass into a manifold tube having a delivery slot and air exhaust apertures, with the grain passing through the slot into the grain drill and the air exiting through the exhaust apertures. The hopper, blower device and conduit may be formed as a stand alone unit which, during filling, is connected to the manifold assembly that is secured to the grain drill. In addition, the hopper and blower device may be formed as a unit that is mounted on the frame of the grain drill so as to be movable between a storage or transport position and a filling position.

24 Claims, 4 Drawing Sheets

AIR-POWERED APPARATUS FOR FILLING GRAIN DRILLS AND METHOD OF USING SAME

BACKGROUND OF THE INVENTION

1. Field of the Invention

The present invention relates generally to apparatus for filling grain drills with grain and, more particularly, to an air-powered or pneumatic apparatus for filling grain drills with grain.

2. Description of Relevant Art

Grain drills, devices for placing seeds or grain in the ground after a furrow or seedbed has been formed by a suitable tillage tool, are known in the art. Such drill apparatus often use a jet of air to deposit grain in the soil at the desired planting depth. A plurality of tubes carried by the grain drill may be arranged one after another with each tube operating to deposit a seed intermittently during travel of the drill. The grain drill typically includes a hopper or similar compartment in which is stored the supply of grain that is fed to the drill tubes. It is often necessary to fill and refill the grain drill hopper during a planting operation. For example, a farmer will stop at the end of a field near a gravity box or like device filled with grain, refill the grain drill, and then continue the planting operation.

Many prior art grain drills utilize an auger system to fill the hopper with grain. U.S. Pat. No. 2,746,621 discloses a seed box feeder for grain drills which includes a cover connected to the open upper end of the drill. At one end of the cover an inlet is provided through which grain is inserted. The grain is carried by an auger away from the inlet along the length of the seed box.

It also is known to position a tractor with a gravity box containing a large quantity of grain next to the grain drill, with an auger being used to carry grain from the box to the top of the grain drill. A second auger conveys the grain horizontally along the length of the inlet of the grain drill. The inlet of the grain drill has a length that may extend completely across from one side of the drill to the other. It is important that grain be delivered across the full length of the grain drill inlet in order to evenly distribute the grain among the seeding tools.

While prior art devices for filling grain drills perform satisfactorily, there remains room in the art for improvement with respect to apparatus for filling and refilling grain drills.

SUMMARY OF THE INVENTION

The present invention provides an apparatus which is powered by air for pneumatically conveying grain from a grain supply to the inlet of a grain drill. The apparatus includes a grain hopper or like assembly for receiving a supply of grain, the hopper having a lower portion that defines an outlet. The outlet opens into a grain conveying conduit which receives pressurized air generated by a blower device. The blower device, which may, for example, be a fan powered by a motor, directs pressurized air into the grain conveying conduit. The forced air passes beneath the outlet of the hopper and entrains grain exiting therefrom, and the air and grain mixture continue on through the conduit and away from the hopper.

The conveying conduit preferably includes a flexible hose which connects the grain hopper assembly to the inlet of a grain drill such that the grain (and air) carried therein is conveyed to the drill. To accomplish this, the present invention provides a manifold assembly which is secured to the inlet of the grain drill. The manifold assembly includes a housing which can be attached to the upper surface of the grain drill so as to enclose the drill inlet thereof. A manifold tube is disposed in, and secured to, the housing, with an end of the tube being secured to the grain conveying conduit. The manifold tube includes an elongated delivery opening or slot and a plurality of exhaust openings. The grain and air are conveyed to the manifold tube, and the grain is dispensed through the delivery slot into the inlet of the grain drill while the air escapes through the exhaust openings. The present invention achieves improved and precisely controlled delivery of grain to the drill.

Other features and advantages of the present invention will become apparent from the following detailed description of preferred embodiments thereof, taken in conjunction with the accompanying drawings, wherein:

DETAILED DESCRIPTION OF PREFERRED EMBODIMENTS

Figure 1:
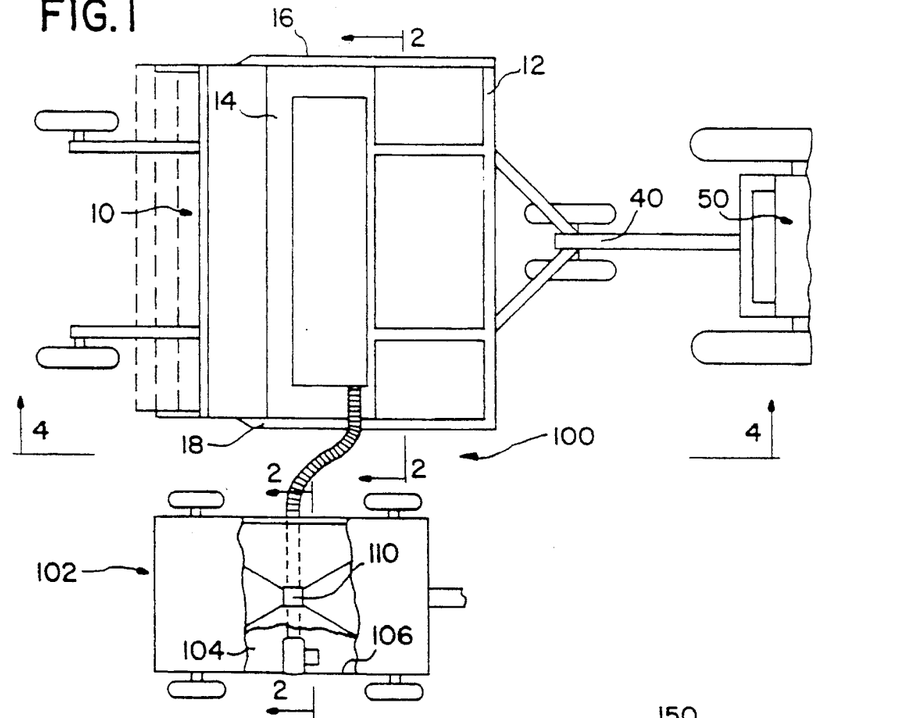
FIG. 1 is a plan view of a grain drill apparatus being towed by a tractor, along with a drill-fill apparatus constructed according to an embodiment of the present invention.

FIG. 1 depicts in plan view the drill-fill apparatus of the present invention, indicated generally by the reference numeral 100, in combination with a grain drill indicated by the reference numeral 10. The grain drill 10 is pulled by a tractor 50 via a hook-up 40 as is known in the art. In the embodiment shown in FIGS. 1 and 2, the grain drill 10 is utilized with a wheeled hopper assembly 102 which may be, for example, a gravity box. The drill-fill apparatus 100 may, of course, utilize other types of containers or hoppers. In use, a farmer typically will plant grain in the field until the supply of grain in the drill 10 is exhausted. The drill 10 then will be pulled to the end of the field and the apparatus 100 of the invention will perform the filling operation which is described in detail below.

The structure of the grain drill 10 is conventional and includes a support frame 12, an upper surface portion 14, sides 16 and 18, and a lower portion 20. As those skilled in the art will appreciate, grain drill 10 includes a storage compartment or area 24 (FIG. 5) which holds a supply of grain G, the compartment being accessed through entry opening 22 defined in upper surface 14 of the drill 10. The grain G is fed to the lower portion 20 of drill 10 where suitable structure, e.g., air-powered tubes or fluted seed cups, dispenses the grain in a furrow or seedbed previously prepared according to the planting operation.

Figure 2:
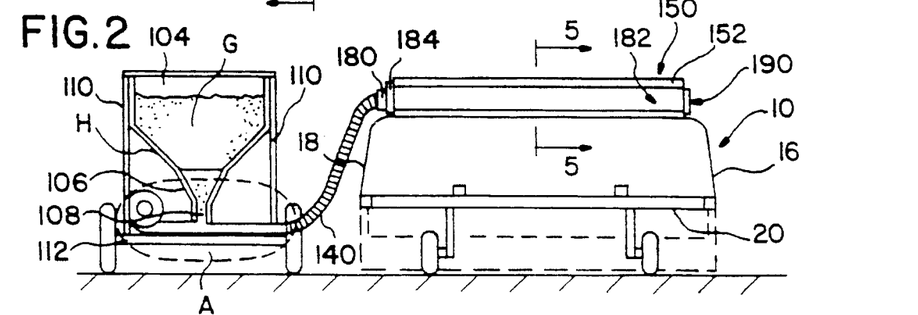
FIG. 2 is a front elevation view of the apparatus depicted in FIG. 1 taken along lines 2—2, with some portions thereof shown in section.

In the embodiment shown in FIGS. 1 and 2, the grain drill 10 is conventional and does not form part of the invention. The filling apparatus may be used with various types of grain or seed drills, or other conventional planting devices. Accordingly, the operation of the grain drill 10 itself will not be discussed in further detail.

A first embodiment of the drill-fill apparatus 100 of the present invention is shown in FIGS. 1–6 and includes two main components, a grain hopper assembly 102 and a manifold assembly 150. Grain hopper assembly 102 includes a hopper H having an upper portion 104 and a lower portion 106. The lower portion 106 has an outlet 108 through which the grain G exits hopper H, as will be described below. The hopper H is secured to a support structure 110 which may have a generally rectangular shape with the lower portion 106 of the hopper disposed near the floor 112 of support structure 110 (FIG. 2).

Figure 3:
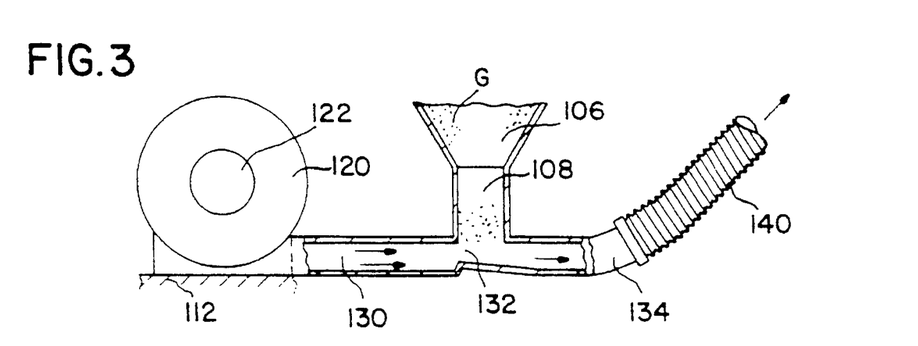
FIG. 3 is an enlarged view of the portion of FIG. 2 enclosed in circle A.
Figure 4:
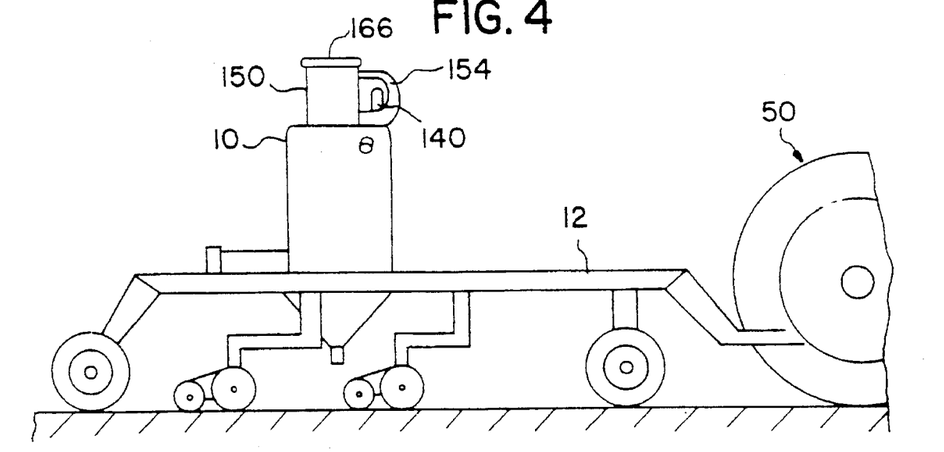
FIG. 4 is a side elevation view of the apparatus depicted in FIG. 1 taken along lines 4—4.

As best seen in FIGS. 2 and 3, disposed within support structure 110 at the floor 112 thereof is an air blower device indicated schematically at 120. The outlet of the air blower device 120 communicates with an air/grain conveying conduit 130 so as to force air therethrough. Air blower device can be in the form of any apparatus for generating pressurized air, and in a preferred embodiment is a fan driven by a motor 122. Of course, other devices for generating pressurized air, e.g., a pump, may be used in lieu of a fan. The motor can be powered, for example, by the drive source for the tractor 50 which tows the grain drill 10.

Air is forced into conduit 130 by blower device 120 and travels beneath the outlet 108 formed in the lower portion 106 of grain hopper assembly 102. The grain G exiting outlet 108 is entrained in the air rushing through conduit 130 and conveyed therewith away from the hopper assembly 102 to the manifold assembly 150 as will be described below. FIG. 3 shows end 134 of conveying conduit 130 secured to a flexible hose 140 leading to the manifold assembly 150. It will be readily recognized that one or more hoses, tubes, etc., may be used to form the air/grain conveying conduit 130.

In order to convey grain G through conduit 130, conduit 140, and to manifold assembly 150 in the desired manner, the present invention preferably includes a venturi portion 132 formed in the conduit 130. As will be appreciated by persons skilled in the art, venturi portion 132 defines a restricted diameter throat portion and a diverging portion. The venturi portion 132 preferably is disposed directly beneath the outlet 108 of hopper portion 106. Due to the reduced pressure (and increased velocity) of the air caused by flow through the venturi portion 132, i.e., with respect to the pressure in the hopper outlet 108, a pressure differential is created which serves to draw the grain G into the air stream rushing through conveying conduit 130. In this manner, grain G is continuously pulled into the conduit 130, entrained in the air passing therethrough, and conveyed to the manifold assembly 150.

In a preferred embodiment, the blower device 120 is a low pressure fan that delivers 1700 cubic feet of air per minute (at a static pressure of 40 inches of water), which fan requires 22 horsepower at 5800 rpm to generate the air flow mentioned above. It should be appreciated that the above-described blower device is but one example of many possible configurations to achieve various desired air outputs.

Figure 5:
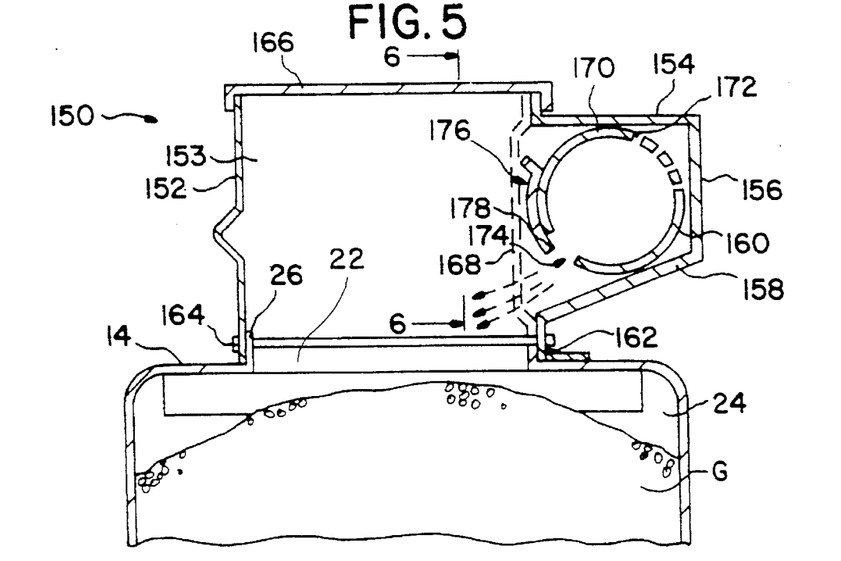
FIG. 5 is a sectional view of the grain drill apparatus depicted in FIG. 2 taken along lines 5—5.

The pressurized air carries the grain through hose 140 to a manifold assembly 150 which is secured to the upper surface 14 of grain drill 10. As best seen in FIG. 5, upper surface 14 has an entry opening 22 formed therein to provide access to the grain compartment 24 of drill 10. Entry opening 22 extends essentially along the length of upper surface 14, i.e., along the width of drill 10 (from one side 16 to the other side 18). Upper surface 14 includes an upturned flange 26 to which is secured manifold assembly 150.

In particular, manifold assembly 150 includes a housing 152 which defines an extension compartment 153 and a manifold tube compartment 160, the latter compartment preferably running along one side of the extension compartment 153. Housing 152 may be formed of a sheet metal member which is secured to the upper surface flange 26 of grain drill 10 so as to overlie the entry opening 22 thereof. The housing 152 may be pivotally connected to the grain drill 10 to provide access to the latter, with the connection between the respective elements permitting easy attachment and removal of the housing 152 from the grain drill. The compartment 153 is open at the upper portion thereof and a cover member 166 (which may be the cover used to close the entry opening 22 of drill 10) is positioned to close off the housing member 152.

The manifold tube compartment 160 preferably is formed by top wall 154, side wall 156, and slanted bottom wall 158 of housing 152. A flange portion 162 is formed on housing 152 and is secured to grain drill flange 26 by fasteners 164. As best seen in FIG. 5, manifold tube 170 preferably is positioned in the compartment 160 so as to be relatively adjacent entry opening 22 of grain drill 10. Manifold tube 170 preferably is in the form of an elongated tubular element having an elongated grain delivery slot 174 and air exhaust apertures 172. While a tube having a circular cross-section is preferred, it will be recognized that other tube configurations may be used.

As indicated by FIGS. 2, 3 and 5, grain is conveyed to tube 170 by conveying conduit 140. Conveying conduit 140 is secured to one end of manifold tube 170 via an extended portion 180 thereof (FIG. 2). The grain is forced into tube 170 and exits through slot 174 into the grain storage area 24 of drill 10, as indicated by the arrows in FIG. 5. The air which carries the grain into manifold tube 170 exits the tube through exhaust apertures 172, passes into compartment 160, and then is released to the atmosphere through an exhaust slot or slots (not shown) provided in the outer housing 152, e.g., in one of portions 154, 156 or 158 thereof.

The pressurized air provided by air blower device 120 carries grain along the length of the manifold tube 170, whereby the grain is dispensed into grain storage area 24 substantially along the complete width of the grain drill 10. In this manner, the grain drill 10 is filled evenly along the width thereof (i.e., from left side 18 to right side 16 in FIG. 2). As discussed below, by varying the configuration of the air exhaust apertures 172 in tube 170, the amount, speed, etc., of the delivered grain may be controlled. In addition, the number and/or configuration of the air exhaust slots formed in the manifold housing 152 may be varied as well.

Figure 6:
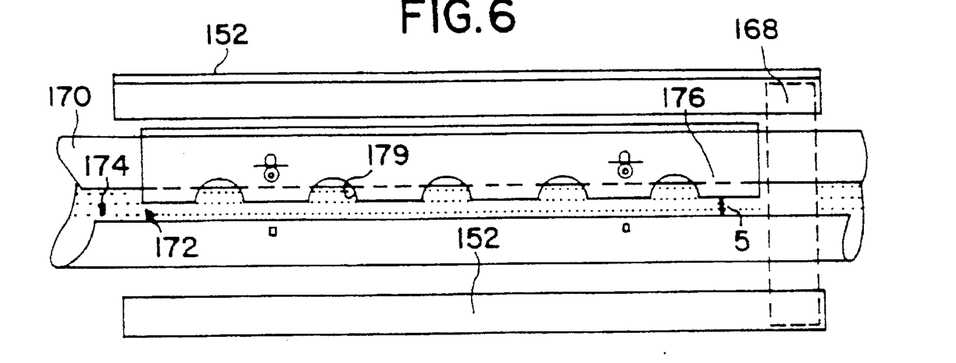
FIG. 6 is a sectional view of the manifold assembly depicted in FIG. 5 taken along lines 6—6, with portions of the housing broken away for clarity.

The manifold tube 170 has one end 180 with a flange 184 (FIG. 2) which flange is secured, e.g. by bolts, to an end of housing 152. As described above, this end 180 of tube 170 preferably is attached to the conveying conduit 140 by any suitable fastener, e.g., clamps, screws, bolts, clips, etc. The other end 182 of manifold tube 170 is received in a retainer plug 190. The retainer plug 190 preferably has a sleeve portion which receives the end 182 of tube 170, and a flange portion which is secured to an opposite end of the housing 152 in a manner similar to the securement of tube flange 184. The above-described arrangement permits the manifold tube 170 to be inserted into housing 152 from either the left or right side of housing 152 (as viewed in FIG. 2) and securely fixed thereto. FIGS. 5 and 6 depict (in phantom) stiffener members 168 which may be secured in a spaced manner to the inside of housing 152 to strengthen the housing and retain manifold tube 170 within compartment 160.

The present invention preferably provides close-off doors on the manifold tube 170 to controllably meter the delivery of grain from the tube slot 174 to the storage area 24 of grain drill 10. A door 176, shown in FIGS. 5 and 6, includes an arcuate portion 178 which conforms to the rounded periphery of manifold tube 170. The door 176 is adjustably secured to the exterior of tube 170 as best seen in FIG. 6 and preferably includes semicircular cut-out portions 179 which form passages for the flowing grain. The grain G also flows out of the manifold tube 170 between cut-out portions 179 through slot 174 beneath the lower edge of close-off door 176 (i.e., if the door is positioned away from the lower edge of slot 174—as viewed in FIG. 5 and indicated by space S in FIG. 6).

One or more close off doors 176 may be used and positioned one after another along the length of the manifold tube 170. As indicated somewhat schematically in FIG. 6, the door 176 may include apertures or the like to permit attachment thereof to the tube 170 in an adjustable fashion, e.g., by fasteners that pass through mating apertures formed in the tube. The door 176 may be adjusted by sliding arcuate portion 178 toward or away from slot 174 along the circumference of tube 170, and then fixing the components together at the desired location using the aforementioned fasteners.

An important benefit achieved by the present invention is that once the apparatus 100 is attached to the grain drill 10 and the filling operation begun, the drill will automatically be filled with grain after which the apparatus 100 automatically shuts down. That is, once the compartment 24 of grain drill 10 fills up with grain, the grain occludes the outlet slot 174 of manifold tube 170. Therefore, no additional grain is conveyed along conduit 140 and, due to the pressure generated by air blower device 120, substantially no dead volume of grain remains in the conveying conduit between hopper apparatus 102 and manifold assembly 150. Thus, the conveying conduit 140 can be disconnected from the manifold assembly 150 and the grain drill 10 is ready to resume the planting operation.

Another significant feature of the present invention is the interchangeability of manifold tubes 170 to permit use with various grain or seed varieties. By varying the number and size of the air exhaust apertures 172 formed in the manifold tube 170, the invention may be used to efficiently convey different varieties of grain. For example, a particular size and number of exhaust apertures 172 may effectively deliver grain to sow soy beans, while a different size and/or number of apertures may effectively deliver grain to sow wheat. With the present invention, it only is necessary to change the manifold tube 170 to facilitate usage of the apparatus to fill the planting device with a different grain variety.

As explained above, the manifold tube 170 and conveying conduit assembly 140 may be inserted from either end of the manifold housing assembly 152. This provides greater flexibility in adapting the invention for use with various grain drills and other planting apparatus. For example, the grain hopper assembly 102 can be positioned on the side of the grain drill 10 having less equipment, hoses, etc., and the conveying conduit 140 and tube 170 hooked up to the previously-connected manifold housing 152. The drill-fill apparatus 100 then can be operated to fill the grain drill 10.

Figure 7A:
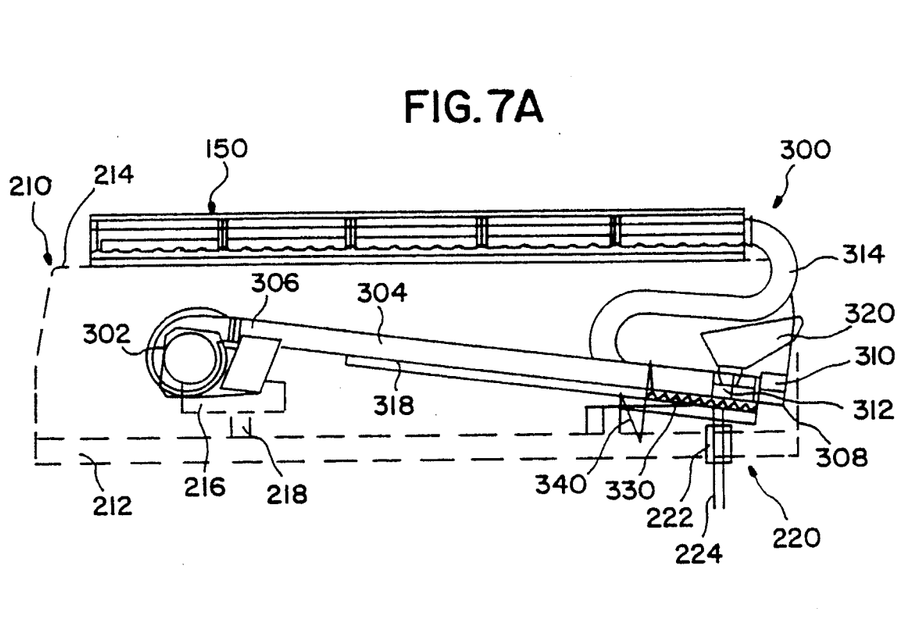
FIG. 7A is a front elevation view of a drill-fill apparatus according to a further embodiment of the present invention, with the blower assembly of the apparatus positioned for storage or transport.
Figure 7B:
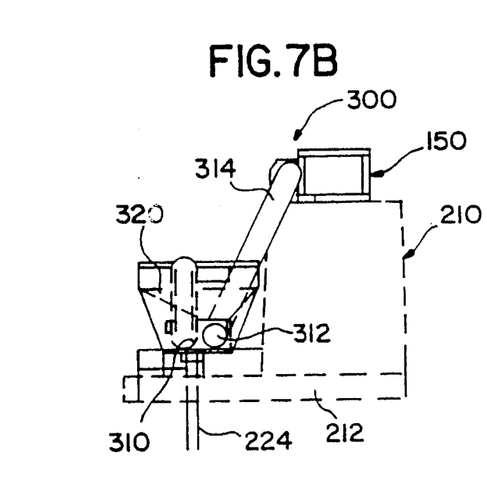
FIG. 7B is a side elevation view of the apparatus depicted in FIG. 7A.
Figure 8:
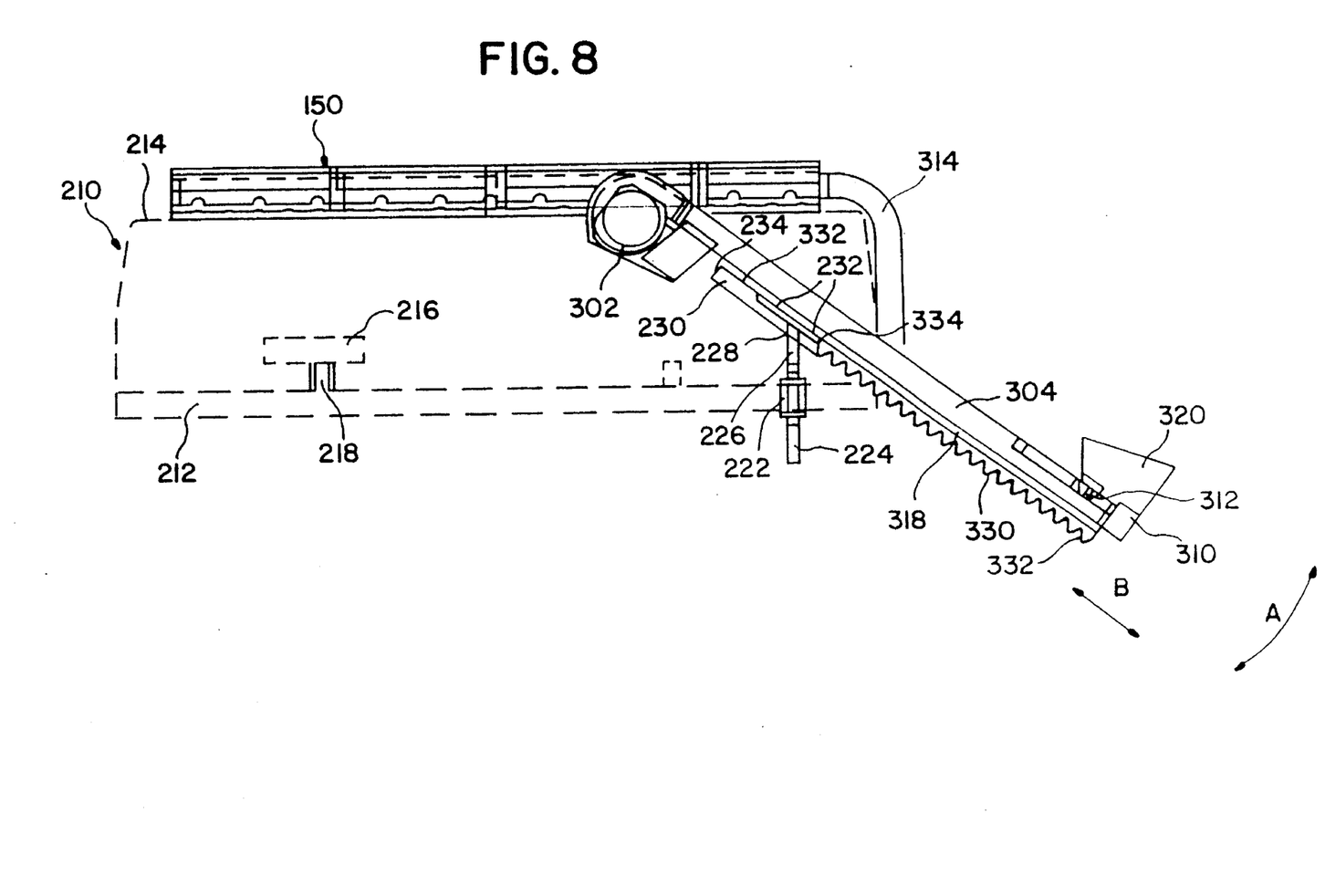
FIG. 8 is a front elevation view of the apparatus depicted in FIGS. 7A and 7B with the blower assembly thereof positioned to fill a grain drill with grain.

A second embodiment of the present invention is shown in FIGS. 7A, 7B and 8 and includes an air-powered filling apparatus 300. The apparatus 300 is mounted on and carried by a grain drill 210, as will be described below. Thus, whereas in the first embodiment the grain hopper is combined with the blower portion of the filling apparatus but is separate from the grain drill, in the second embodiment the filling apparatus is mounted on the grain drill itself. As will be described below, the apparatus is movable between a storage or transport position (FIG. 7A) and a position for filling the drill with grain (FIG. 8).

FIG. 7A shows the apparatus 300 mounted on the grain drill 210 (the drill being depicted in phantom). Grain drill 210 is similar to the drill 10 described in connection with the first embodiment but includes additional structure to facilitate mounting the apparatus 300 thereon. The drill 210 includes a frame portion 212 and an upper portion 214, the manifold assembly 150 being secured to portion 214. The drill has a cradle 216 secured to frame 212 by bracket 218, and a pivoted connection point 220 by which the blower device is adjustably mounted as will be described below.

The apparatus 300 includes a blower assembly or portion which includes an air blower 302, which may be a fan, a blower tube 304 having a first end 306 and a second end 308, and a hose 314 which connects the blower tube with the manifold assembly 150 (the structure of the latter corresponding to that described with respect to the first embodiment). The end 308 of blower tube 304 leads into a 180° turnaround 310 which the air from blower 302 follows upon leaving tube 304 and before entering hose 314. The portion of the turnaround 310 which is on the same side as the hose 314 (on the right in FIG. 7B) includes a venturi portion 312 which operates in the same manner as the venturi portion 132 described above. A hopper 320 is disposed above the venturi portion 312 and includes an upper portion which receives grain, and a lower portion with an outlet which communicates with the venturi portion 312. The configuration of the outlet of the hopper 320 and its cooperation with the blower tube 304 and venturi portion 312 preferably is as described above and, therefore, will not be discussed in detail here. Thus, grain which is positioned in the hopper passes through the outlet thereof and is drawn into the venturi portion 312 for delivery to the manifold assembly 150.

The blower portion of apparatus 300 is mounted on the grain drill 210 so as to be movable between a storage or transport position and a filling position. The blower tube 304, at an area adjacent blower 302, is removably positioned in the cradle 216 of grain drill 210. The opposite end of the blower tube 304 is positioned at pivoted connection point 220 to permit the blower to be moved from the position shown in FIG. 7A to that shown in FIG. 8. Although the structure used to facilitate this movement is not critical to the present invention, an example of suitable connections is discussed below.

In a preferred embodiment, the pivotal connection 220 includes a bracket 222 formed by two confronting plates secured to each other across the horizontal support of frame 312 seen in FIG. 7A. The bracket plate disposed internally of the horizontal support (i.e., to the right in FIG. 7B) has a vertical tube 224 welded thereto so as to extend upward from frame 212. A second vertical tube 226 is positioned within the tube 224 so as to be slidable and rotatable relative thereto. The upper end of the tube 226 has a transverse bushing secured thereto and extending outward from the outer surface of the tube 226. A pair of elongated plates 230 are connected in confronting fashion to the bushing in tube 226 to form a channel. The connection of the plates 230 at point 228 permits pivoting of the plates 230 in an up and down manner (i.e., clockwise or counterclockwise in FIG. 7A). The two plates 230 may be joined by end plates 234 at the respective ends thereof, and rollers 232 extend horizontally in the channel between the plates 230 for slidably receiving the blower tube 304. The blower tube 304 includes a pair of L-shaped rails 318 secured along a length thereof. The longer legs of the rails are vertical and parallel and the shorter legs of the rails extend horizontally away from each other. The shorter legs are positioned on the rollers 232 to permit the blower tube 304 to be slidable along the plates 230 of connection 220.

An extension spring 330 has one end 332 secured to the distal end of blower tube 304 and an opposite end fixed to one end of a chain 340. The chain has an opposite end which is fixed to the leftmost end plate 234 of the plates 230. In this manner, the blower tube 304 may be released from cradle 316 and moved to a desired position such that the hopper 320 is located adjacent the grain supply, e.g., as seen in FIG. 8. When moving the blower assembly to the position shown in FIG. 8, the tube 304 slides along the rollers 232 and, at a predetermined point, the spring 330 becomes tensioned so as to smoothly position the hopper 320 at the desired location. The blower assembly and tube 304, and thus the hopper 320, may be moved pivotally about connection point 220 (arrow A in FIG. 8), vertically by relative movement of tube 226 relative tube 224, and horizontally by sliding along rollers 232 (arrow B in FIG. 8). Therefore, a great amount of flexibility and freedom of movement are provided to permit manipulation of the blower assembly and filling of the grain drill via the most convenient manner.

The hose 312 of the apparatus 300 connects to the inlet of the manifold assembly 150 in the same manner as in the previous embodiment. Thus, the primary difference between the first and second embodiments is that, in the latter, the blower assembly and grain hopper are mounted on the planting device, i.e., the grain drill.

Numerous benefits are provided by this arrangement. First, the farmer does not need a dedicated grain container such as a gravity box for filling the planting device. Rather, seed can be hauled to the field in any container that can be unloaded into the hopper 320 of the apparatus 300. Also, because the blower assembly is mounted on the grain drill, it is not necessary to connect and disconnect the blower assembly to the manifold assembly (as in the first embodiment) and, in addition, a smaller length of hose may be used. As described above, the blower assembly and hose are easily movable to and from its storage/transport position so as to not interfere with planting when it is not being used. Finally, the planter-mounted apparatus 300 may be operated by the hydraulic system of the tractor which pulls the planter. Thus, in many ways, the planter-mounted embodiment provides a simpler, more efficient arrangement since the blower assembly and grain hopper are always located with the planting device and ready for use.

It is apparent that the present invention provides an improved apparatus for carrying grain from a supply thereof to the inlet of a grain drill whereby the drill may be filled with grain and then used to carry out a planting operation. The present invention achieves its objects while providing an uncomplicated yet very flexible system which may be used with different types of grain drills. The invention fills a grain drill in an even manner and without delay to reduce non-planting time and increase overall efficiency and production.

While the present invention and the embodiments presented herein have been set forth and described in detail for the purposes of making a full and complete disclosure of the subject matter thereof, such disclosure is not intended to be limiting in any way with respect to the true scope of this invention as the same is set forth in the appended claims.

What is claimed is:

1. An apparatus for supplying grain to a grain drill which dispenses grain in a desired location in the ground, the apparatus comprising:

a grain hopper for receiving a supply of grain, the grain hopper having an upper portion and a lower portion, the upper portion being open to fill the grain hopper with a desired amount of grain, and the lower portion having an outlet which opens into a grain conveying conduit and feeds grain into the conduit;

an air blower device for generating pressurized air, the blower device communicating with the grain conveying conduit to force pressurized air therethrough which entrains grain exiting from the outlet of the lower portion of the grain hopper, the conveying conduit having a section extending away from the blower device and grain hopper; and a manifold assembly connected to the grain conveying conduit to receive grain carried through the conduit by the air, the manifold assembly having means for securing the assembly to an inlet of a grain drill to fill the drill with grain;

wherein the manifold assembly includes an elongated manifold tube with an elongated opening for dispensing grain into the inlet of the grain drill.

2. An apparatus as claimed in claim 1, wherein the grain conveying conduit includes a venturi portion disposed below the outlet in the lower portion of the grain hopper, and the venturi portion creates a pressure drop in the conduit with respect to the pressure in the hopper to draw grain into the conduit from the hopper.

3. An apparatus as claimed in claim 1, wherein the air blower device is a fan.

4. An apparatus as claimed in claim 1, wherein the manifold assembly includes a housing configured to be secured adjacent an inlet of a grain drill and the manifold tube is disposed in the housing.

5. An apparatus as claimed in claim 4, wherein the opening in the manifold tube is elongated for delivering grain into the inlet of the grain drill along substantially the entire length of the inlet, and the manifold tube has a plurality of exhaust openings through which the air that carries the grain to the manifold assembly escapes, and the housing has at least one exhaust opening through which air escapes therefrom.

6. An apparatus as claimed in claim 5, wherein the manifold tube is circular in cross-section.

7. An apparatus as claimed in claim 4, wherein a door member is secured to the manifold tube with a portion of the door member at least partially occluding the elongated opening of the manifold tube to control the delivery of grain therethrough, the opening in the manifold tube being elongated to extend along substantially the entire length of the inlet of the grain drill and further including at least one air exhaust opening in the manifold tube.

8. An apparatus as claimed in claim 7, wherein a plurality of door members are secured along the length of the manifold tube.

9. An apparatus as claimed in claim 7, wherein the door member is adjustable with respect to the manifold tube to permit the amount of grain delivered through the elongated opening to be adjusted.

10. An apparatus as claimed in claim 7, wherein the door member has an arcuate portion disposed over a rounded periphery of the manifold tube, the arcuate portion having spaced cut-out sections forming passages for delivering grain.

11. An apparatus as claimed in claim 5, wherein the manifold tube has two opposite ends, one end having a flange portion secured to one side of the housing and an extension portion connected to the grain conveying conduit, and the other end mating with a retainer plug that includes a flange, the retainer plug flange being secured to an opposite side of the housing, whereby the manifold tube may be inserted into the housing from either side thereof.

12. An apparatus as claimed in claim 5, further including a plurality of interchangeable manifold tubes wherein at least one of the number of air exhaust openings and the size of the air exhaust openings is varied among the tubes for facilitating the delivery of different varieties of grain.

13. An apparatus for filling a planting device with grain, the planting device having a storage compartment for grain and an entry opening which provides access to the storage compartment, the apparatus comprising:

a grain hopper for receiving a supply of grain, the grain hopper having an upper portion and a lower portion, wherein the hopper may be filled through the upper portion with grain, and the lower portion has an outlet that opens into a grain conveying conduit and supplies grain to the conduit;

an air blower unit communicating with the grain conveying conduit and forcing pressurized air through the conduit so that the air entrains grain exiting from the outlet of the lower portion of the grain hopper, the conveying conduit extending away from the blower device toward a manifold assembly; and the manifold assembly being connected to the grain conveying conduit and receiving grain carried through the conduit by the pressurized air, the manifold assembly being configured for securement to the planting device to deliver the grain to the manifold assembly and through the entry opening and into the storage compartment of the planting device;

wherein the apparatus includes means for securing the manifold assembly to the planting device with the manifold assembly overlying substantially the entire length of the inlet of the planting device.

14. An apparatus as claimed in claim 13, wherein the grain conveying conduit includes a venturi portion disposed below the outlet in the lower portion of the grain hopper, and the venturi portion creates a pressure drop in the conduit with respect to the pressure in the hopper to draw grain into the conduit from the hopper.

15. An apparatus as claimed in claim 13, wherein the air blower unit is a fan.

16. An apparatus as claimed in claim 13, wherein the manifold assembly includes a housing configured to be secured adjacent the entry opening of the planting device and a manifold tube to which the grain conveying conduit is attached, the manifold tube being disposed in the housing and having an opening therein to deliver grain from the conveying conduit into the entry opening of the grain drill.

17. An apparatus as claimed in claim 16, wherein the opening in the manifold tube is elongated for delivering grain into the entry opening of the grain drill along substantially the entire length thereof, a plurality of exhaust openings are formed in the manifold tube through which the air that carries the grain to the manifold assembly can escape, and the housing has at least one exhaust opening to allow air to escape therefrom.

18. An apparatus as claimed in claim 13, wherein the conveying conduit is connected to the hopper and the apparatus has means for mounting at least one of the air blower unit and grain conveying conduit on a planting device, with said at least one of the air blower unit and hopper being movable from a storage position to an in-use position.

19. A process for conveying grain from a supply of grain to a storage compartment of a grain-planting apparatus, the process comprising steps of:

feeding a supply of grain to a hopper having a lower portion and an outlet disposed at the lower portion, the outlet opening into a conveying conduit and transferring grain from the hopper to the conveying conduit;

operating an air blower device to force pressurized air into the conveying conduit and beneath the outlet of the hopper to entrain grain exiting the hopper through the outlet; and conveying the grain and air through the conveying conduit to a manifold assembly secured to the grain-planting apparatus and including an elongated manifold tube having an elongated opening extending along a portion of the length thereof such that the grain passes through the elongated opening formed in the manifold tube and into the grain storage compartment of the planting apparatus, while venting air through exhaust openings formed in the manifold assembly;

whereby grain is conveyed from the hopper, through the conveying conduit, into the manifold assembly, and into the grain storage compartment of the grain-planting apparatus.

20. An apparatus as claimed in claim 19, further including the step of providing a venturi portion in the conveying conduit beneath the outlet in the lower portion of the grain hopper, the venturi portion creating a pressure drop in the conveying conduit with respect to the pressure in the grain hopper in order to draw grain into the conduit from the tank.

21. An apparatus for supplying grain to a grain dispensing device, the apparatus comprising:

a grain hopper for receiving a supply of grain, the grain hopper having an upper portion and a lower portion, the upper portion having an opening for filling the grain hopper with a desired amount of grain, and the lower portion having an outlet which communicates with a grain conveying conduit and feeds grain into the conduit;

an air blower device for generating pressurized air and directing the pressurized air into the conveying conduit to entrain grain exiting from the outlet of the lower portion of the grain hopper, the conveying conduit having a section extending away from the blower device and grain hopper; and a manifold assembly connected to the grain conveying conduit to receive grain carried through the conduit by the air, the manifold assembly being configured to be secured to a grain dispensing device to fill the device with grain;

wherein the manifold assembly includes a housing configured to be secured adjacent an inlet of the grain dispensing device and a manifold tube with which the grain conveying conduit communicates, the manifold tube being disposed in the housing and having an opening therein to deliver grain from the conveying conduit into the inlet of the grain dispensing device.

22. An apparatus for filling a planting device with grain, the planting device having a storage compartment for grain and an entry opening which provides access to the storage compartment, the apparatus comprising:

a grain hopper for receiving a supply of grain, the grain hopper having an upper portion and a lower portion, wherein the hopper may be filled through the upper portion with grain, and the lower portion has an outlet that opens into a grain conveying conduit and supplies grain to the conduit, the grain conveying conduit being attached to the hopper;

an air blower unit communicating with the grain conveying conduit and forcing pressurized air through the conduit to entrain grain exiting from the outlet of the grain hopper, the conveying conduit extending away from the blower device toward a manifold assembly; and the manifold assembly being in communication with the grain conveying conduit and receiving grain carried through the conduit by the pressured air, the manifold assembly being configured for securement to the planting device to deliver the grain to the manifold assembly and into the storage compartment of the planting device;

wherein the apparatus is mountable on the planting device and at least one of the conveying conduit and hopper is movable relative to the planting device from a storage position to an in-use position.

23. An apparatus as claimed in claim 22, wherein the apparatus has means for mounting the apparatus on the planting device to permit the conveying conduit and hopper to be moved in a plurality of directions relative to the planting device.

24. An apparatus as claimed in claim 22, further comprising a venturi portion disposed below the outlet in the lower portion of the grain hopper, wherein the venturi portion creates a pressure drop in the conduit with respect to the pressure in the hopper to draw grain into the conduit from the hopper.

* * * * *